United States Patent
Hart et al.

(10) Patent No.: US 10,035,414 B1
(45) Date of Patent: Jul. 31, 2018

(54) AUTOMATICALLY-SHIFTABLE HYBRID TRANSAXLE

(71) Applicant: GM GLOBAL TECHNOLOGY OPERATIONS LLC, Detroit, MI (US)

(72) Inventors: James M. Hart, Belleville, MI (US); Daryl A. Wilton, Macomb, MI (US); Darrell Lee Robinette, Dollar Bay, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/408,670

(22) Filed: Jan. 18, 2017

(51) Int. Cl.
| | |
|---|---|
| *B60K 6/48* | (2007.10) |
| *F16H 3/72* | (2006.01) |
| *F16H 37/08* | (2006.01) |
| *B60K 6/365* | (2007.10) |
| *B60K 6/40* | (2007.10) |
| *B60K 6/54* | (2007.10) |

(52) U.S. Cl.
CPC .............. *B60K 6/48* (2013.01); *B60K 6/365* (2013.01); *B60K 6/40* (2013.01); *B60K 6/54* (2013.01); *F16H 3/724* (2013.01); *F16H 37/0806* (2013.01); *B60K 2006/4816* (2013.01); *B60Y 2200/92* (2013.01); *B60Y 2400/73* (2013.01); *F16H 2200/0008* (2013.01); *F16H 2200/0021* (2013.01); *Y10S 903/91* (2013.01); *Y10S 903/917* (2013.01)

(58) Field of Classification Search
None
See application file for complete search history.

(56) References Cited

U.S. PATENT DOCUMENTS

| | | | | |
|---|---|---|---|---|
| 7,086,977 | B2* | 8/2006 | Supina | B60K 6/365 475/207 |
| 7,544,141 | B2* | 6/2009 | Holmes | B60K 6/365 475/5 |
| 8,512,187 | B2* | 8/2013 | Puiu | B60K 6/445 475/5 |
| 2001/0006919 | A1* | 7/2001 | Takenaka | B60K 6/36 475/5 |
| 2001/0011612 | A1* | 8/2001 | Takenaka | B60K 6/36 180/65.1 |

(Continued)

*Primary Examiner* — Jacob S. Scott
*Assistant Examiner* — Timothy Hannon
(74) *Attorney, Agent, or Firm* — Quinn IP Law

(57) ABSTRACT

An automatically-shiftable transaxle includes an input member configured to receive an external power-source torque and rotate about a first axis. The transaxle also includes torque transmitting device(s) and a gear-train, each operatively connected to the input member for selecting transaxle speed ratios, and a first transfer gear operatively connected to the gear-train and rotatable about the first axis. The transaxle also includes an intermediate shaft rotatable about a second axis, and a second transfer gear rotatably fixed to the intermediate shaft and meshed with the first transfer gear. The transaxle additionally includes an electric motor arranged on a third axis for providing a torque input to the second transfer gear. Furthermore, the transaxle includes a differential assembly operatively connected to the intermediate shaft and rotatable about a fourth axis to thereby transmit a transaxle output torque to drive the load. All four transaxle rotational axes are arranged in parallel.

16 Claims, 4 Drawing Sheets

(56) References Cited

U.S. PATENT DOCUMENTS

| | | | |
|---|---|---|---|
| 2001/0051556 A1* | 12/2001 | Takenaka | B60K 6/36 475/5 |
| 2010/0248883 A1* | 9/2010 | Wittkopp | B60K 6/365 475/5 |
| 2012/0226406 A1* | 9/2012 | Kaita | B60K 6/445 701/22 |
| 2016/0311305 A1* | 10/2016 | Ichikawa | B60K 6/365 |
| 2016/0311306 A1* | 10/2016 | Sugiyama | B60K 6/40 |
| 2017/0113535 A1* | 4/2017 | Hirano | B60K 6/445 |

* cited by examiner

AUTOMATICALLY-SHIFTABLE HYBRID TRANSAXLE

INTRODUCTION

The disclosure relates to an automatically-shiftable transaxle with an internal electric motor.

Modern motor vehicles frequently employ a powertrain that includes a power-source, such as an internal combustion engine, a multi-speed automatically-shiftable or automatic transmission, and a differential or final drive. In cases where the automatic transmission incorporates the differential, the resultant assembly is then typically identified as an automatic transaxle. In front-wheel-drive (FWD) vehicles, the powertrain, including the automatic transaxle, may be mounted transversely with respect to the vehicle's longitudinal axis. A transversely mounted automatic transaxle permits the powertrain to be packaged and the power-source torque to be applied to driven wheels in a restricted underhood space.

An automatic multi-speed transaxle increases the overall operating range of the vehicle by permitting the engine to operate through its torque range multiple times without requiring an operator of the vehicle to manually select specific speed-ratios. The number of forward gear ranges or speed-ratios that are available in the transaxle determines the number of times the engine torque range is repeated. An automatic transaxle such as above may utilize an epicyclic or planetary gearing, or a parallel shaft mounted gear-train, such as in a Dual-Clutch transaxle (DCT), for affecting specific transaxle speed-ratios.

A modern automatic transaxle is typically controlled by an electronic controller, which may either be a dedicated transaxle control unit (TCU) or powertrain control module (PCM) configured to control the entire powertrain, including the power-source. The appropriate controller generally uses data provided by sensors from various vehicle systems to calculate how and when to change gears in the vehicle for optimum performance, fuel economy, and shift quality.

SUMMARY

An automatically-shiftable transaxle for mounting to an external power-source and transmitting a power-source torque therefrom includes an input member configured to receive the power-source torque and rotate about a first axis. The transaxle also includes a gear-train and at least one torque transmitting device, each operatively connected to the input member and cooperatively configured to select transaxle speed ratios. The transaxle additionally includes a first transfer gear operatively connected to the gear-train and configured to rotate about the first axis. The transaxle also includes an intermediate shaft configured to rotate about a second axis that is parallel to the first axis, and a second transfer gear rotatably fixed to the intermediate shaft and in mesh with the first transfer gear. The transaxle additionally includes an electric motor arranged on a third axis that is parallel to the second axis and configured to provide an electric motor torque input to the second transfer gear. Furthermore, the transaxle includes a differential assembly operatively connected to the intermediate shaft and configured to rotate about a fourth axis that is parallel to the second axis to thereby transmit a transaxle output torque to drive a load.

The gear-train may include a planetary gear-set having first, second, and third members. In such a case, the first transfer gear may be in mesh with the third member of the gear-set.

The first member may be a ring gear, the second member may be a planetary carrier, and the third member may be a sun gear.

The transaxle may also include an interlocking device configured to selectively connect the electric motor to the second transfer gear and thereby provide a variable electric motor torque input to the second transfer gear as the electric motor torque input.

The interlocking device may be configured as either a synchronizer or a dog-clutch.

The intermediate shaft may include a first outer spline in mesh with the second transfer gear.

The intermediate shaft may include a second outer spline. The differential assembly may include a differential housing and a differential ring gear fixed to the differential housing. Additionally, the second outer spline may be in mesh with the differential ring gear.

The transaxle may also include a transaxle housing. In such a case, each of the input member, the gear-train, the at least one torque transmitting device, the first transfer gear, the intermediate shaft, the second transfer gear, the electric motor, and the differential assembly may be retained in and supported by the transaxle housing.

The electric motor may include a stator fixed to the transaxle housing and a rotor fixed to a rotor shaft. The rotor shaft may be supported with respect to the transaxle housing via a plurality of bearings.

The transaxle may additionally include a third transfer gear in mesh with the second transfer gear and a reduction gear-set operatively connecting the third transfer gear to the rotor shaft and configured to generate a speed ratio therebetween, The reduction gear-set may be configured as an epicyclic gear-set having a ring gear fixed to the transaxle housing and a carrier member fixed to the third transfer gear and supporting a plurality of pinion gears in mesh with the rotor shaft.

A vehicle employing the automatically-shiftable transaxle mounted externally to a power-source and configured to transmit a power-source torque is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
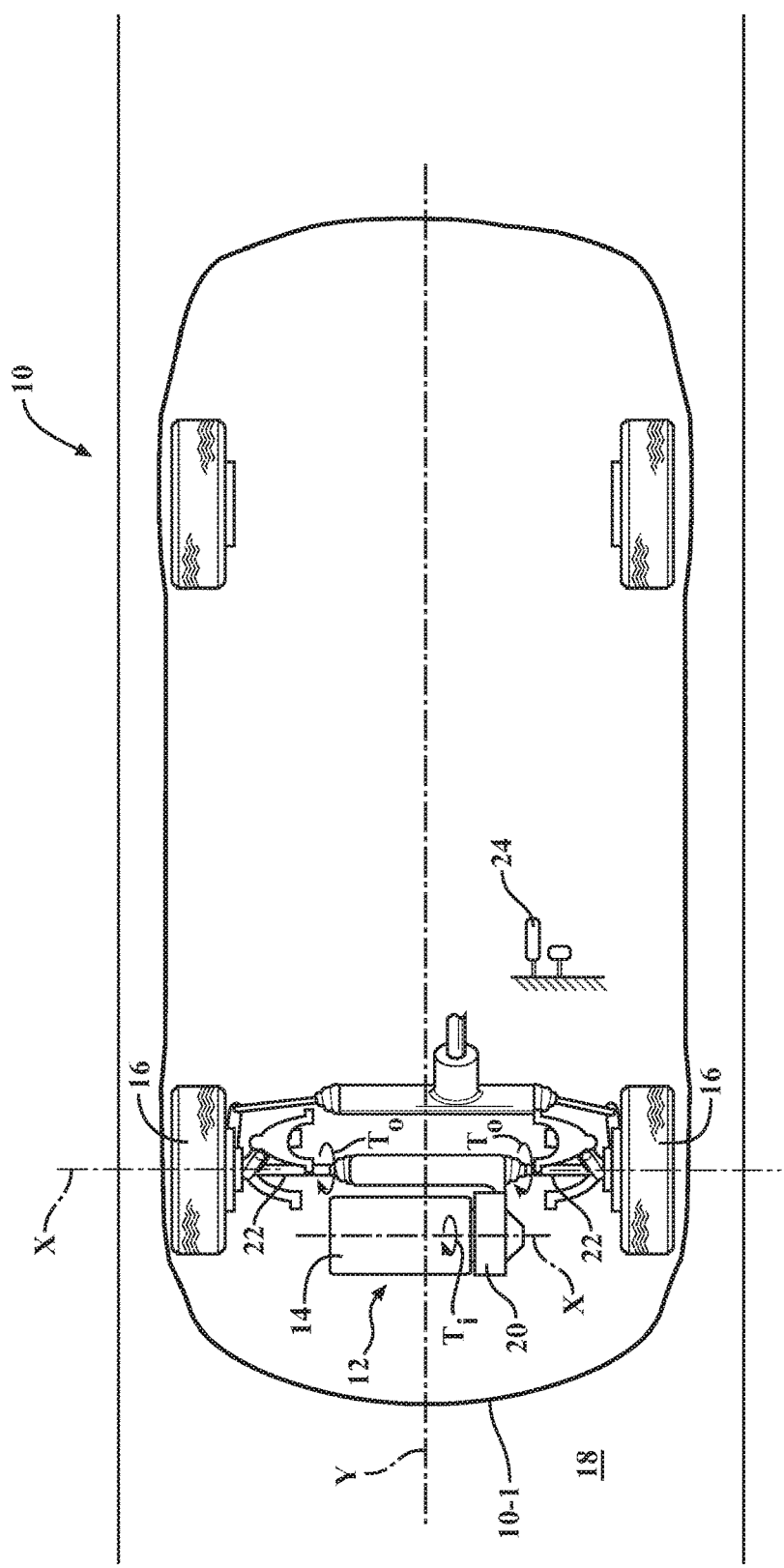
FIG. 1 is a schematic illustration of a vehicle employing a powertrain that includes an internal combustion engine connected to an automatic transaxle incorporating an electric motor, according to the disclosure.
Figure 2:
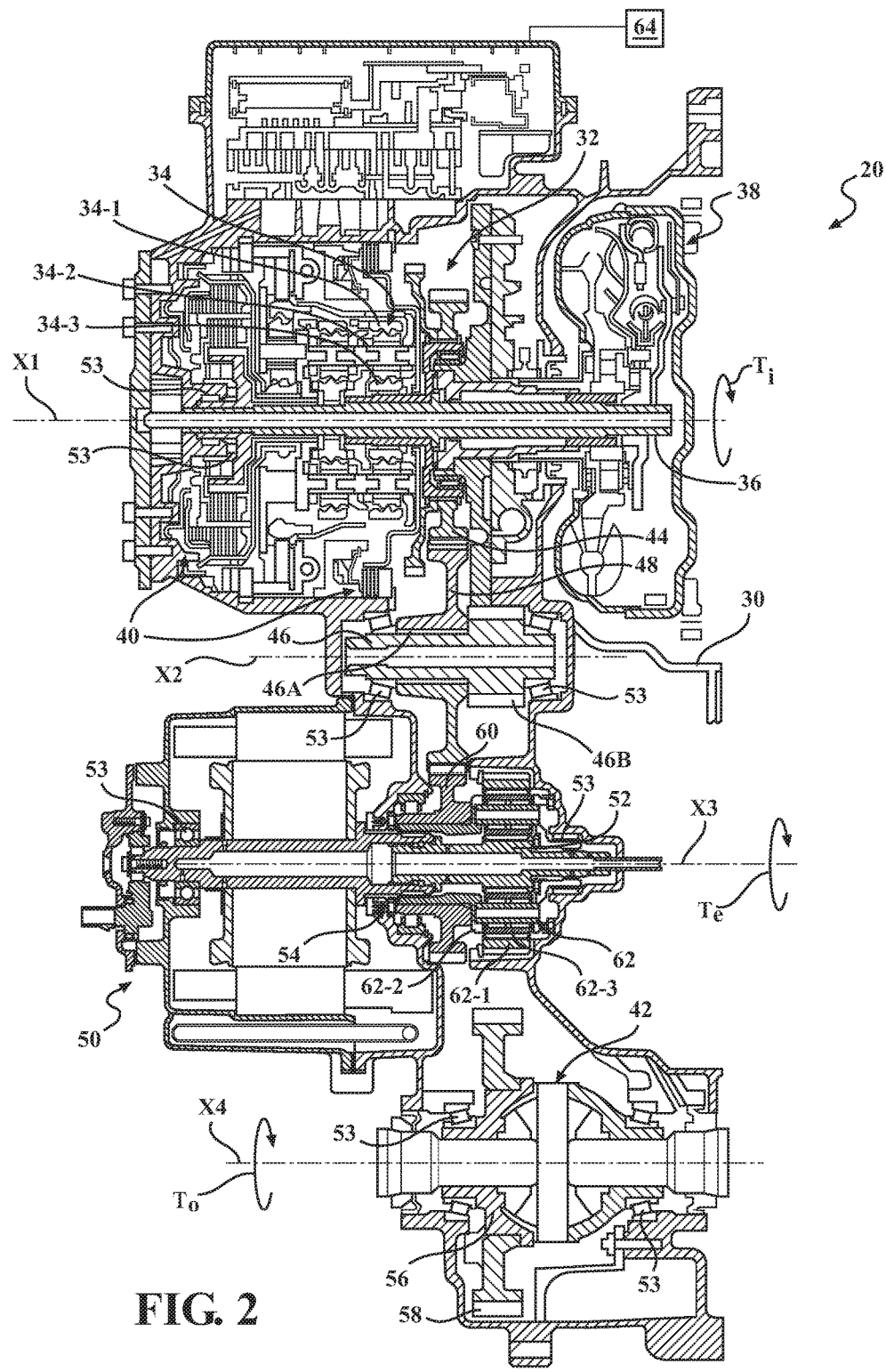
FIG. 2 is a schematic close-up cross-sectional plan view of the automatic transaxle shown in FIG. 1.

Referring to FIGS. 1 and 2, a vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be any mobile platform, such as an airplane, all-terrain vehicle (ATV), boat, personal movement apparatus, robot and the like to accomplish the purposes of this disclosure.

The powertrain 12 includes a power-source 14 configured to generate torque $T_i$ for propulsion of the vehicle 10 via driven wheels 16 relative to a road surface 18. The powertrain 12 also includes a multiple speed-ratio automatically-shiftable, a.k.a., automatic, transaxle 20. The powertrain 12 is mounted transversely in the vehicle 10 along a general axis X, i.e., at approximately 90 degrees relative to a longitudinal axis Y of the vehicle. As understood by those skilled in the art, such a transverse mounting of the powertrain 12 is frequently employed for packaging purposes in front-wheel-drive (FWD) vehicles, where the driven road wheel(s) 16 are arranged proximate a front end 10-1 of the vehicle 10.

The automatic transaxle 20 is operatively connected to the power-source 14, i.e., externally mounted to the power-source and configured to transfer the torque $T_i$ generated by the power-source to the driven wheels 16. The transaxle 20 is further configured to receive and then selectively multiply, reduce, or leave unmodified the torque $T_i$ to achieve a resultant transaxle output torque $T_o$ for driving the vehicle 10. The driven wheels 16 may be operatively connected to the transaxle 20, such as via drive- or half-shafts 22, and configured to receive the transaxle output torque $T_o$. A vehicle accelerator 24, such as a pedal or a lever, is provided for the vehicle operator to control the power-source torque $T_i$ for driving the vehicle 10.

The power-source 14 may include an internal combustion engine, a fuel-cell, and/or an electric motor (not shown) mounted in the vehicle 10 and having the automatic transaxle 20 mounted externally thereto. However, for conciseness and clarity, the present disclosure will concentrate on the embodiment of the power-source 14 that includes solely the internal combustion engine. Accordingly, although the numeral 14 should be seen as generally attributable to such embodiments of the envisioned powertrain, for the remainder of the present disclosure, the numeral 14 will be used to denote the specific embodiment of the powertrain having solely the internal combustion engine. As such, the power-source input torque $T_i$ will be hereinafter referenced as engine 14 torque. Although not shown, the particular engine 14 includes a crankshaft for converting reciprocal motion of its pistons (not shown) into rotational motion and generating the input torque $T_i$, as is understood by those skilled in the art.

The transaxle 20 is paired with the engine 14 at an engine-transaxle interface using any appropriate means, including fasteners (not shown), such as threaded screws and dowels. As shown in FIG. 2, the transaxle 20 includes a transaxle housing or case 30 for retaining a gear-train 32 configured to provide a predetermined number of selectable gear ratios for operatively connecting the engine crankshaft to the driven wheels 16. The gear-train 32 has a number of gear elements 34, generally in the nature of one or more planetary gear-sets configured to provide a predetermined number of selectable gear ratios for operatively connecting the engine crankshaft to the driven wheels 16. The transaxle 20 also includes an input member 36, such as a shaft, configured to receive the engine 14 torque $T_i$ and transfer the subject torque to the gear-train 32. As also shown in FIG. 2, the input member 36 is configured to rotate about a first axis X1. The transaxle input member 36 is generally selectively connectable to the engine 14 through a fluid coupling 38, such as a torque converter.

The transaxle 20 also includes one or more torque transmitting devices 40, such as clutches and brakes, retained by the transaxle housing 30. The gear-train 32 and the torque transmitting device(s) 40 are operatively connected to the input member 36 and are cooperatively configured to select transaxle speed ratios to generate a predetermined amount of transaxle output torque $T_o$. The transaxle speed ratio is generally defined as the transaxle input speed divided by the transaxle output speed. Shifting from one speed ratio to another is typically performed in response to a position of the vehicle accelerator 24 and assessed vehicle road speed. Shifting between speed ratios generally involves releasing one or more "off-going" torque transmitting devices 40 associated with the current speed ratio, and applying one or more "on-coming" torque transmitting devices 40 associated with the desired speed ratio. The transaxle 20 also includes a differential or final-drive assembly 42 configured to transmit the transaxle output torque $T_o$ for driving an external load, such as the driven road wheels 16.

The transaxle 20 includes a first transfer gear 44 operatively connected to the gear-train 30 and configured to rotate about the first axis X1. As shown in FIG. 2, in the gear-train 32, a particular planetary gear-set embodiment of the gear elements 34 may include a first member 34-1, a second member 34-2, and a third member 34-3. According to the disclosure, the first member 34-1 may be a ring gear, the second member 34-2 may be a planetary carrier supporting a plurality of pinion gears, and the third member 34-3 may be a sun gear. The first transfer gear 44 may be in mesh, i.e., in meshed engagement, with the third member 34-3, i.e., the sun gear, of the subject planetary gear-set 34. The transaxle 20 also includes an intermediate shaft 46 configured to rotate about a second axis X2 that is arranged in parallel with the first axis X1 and a second transfer gear 48 rotatably fixed to the intermediate shaft and in mesh with the first transfer gear 44. Specifically, the intermediate shaft 46 may include a first outer spline 46A in mesh with the second transfer gear 48.

Figure 3:
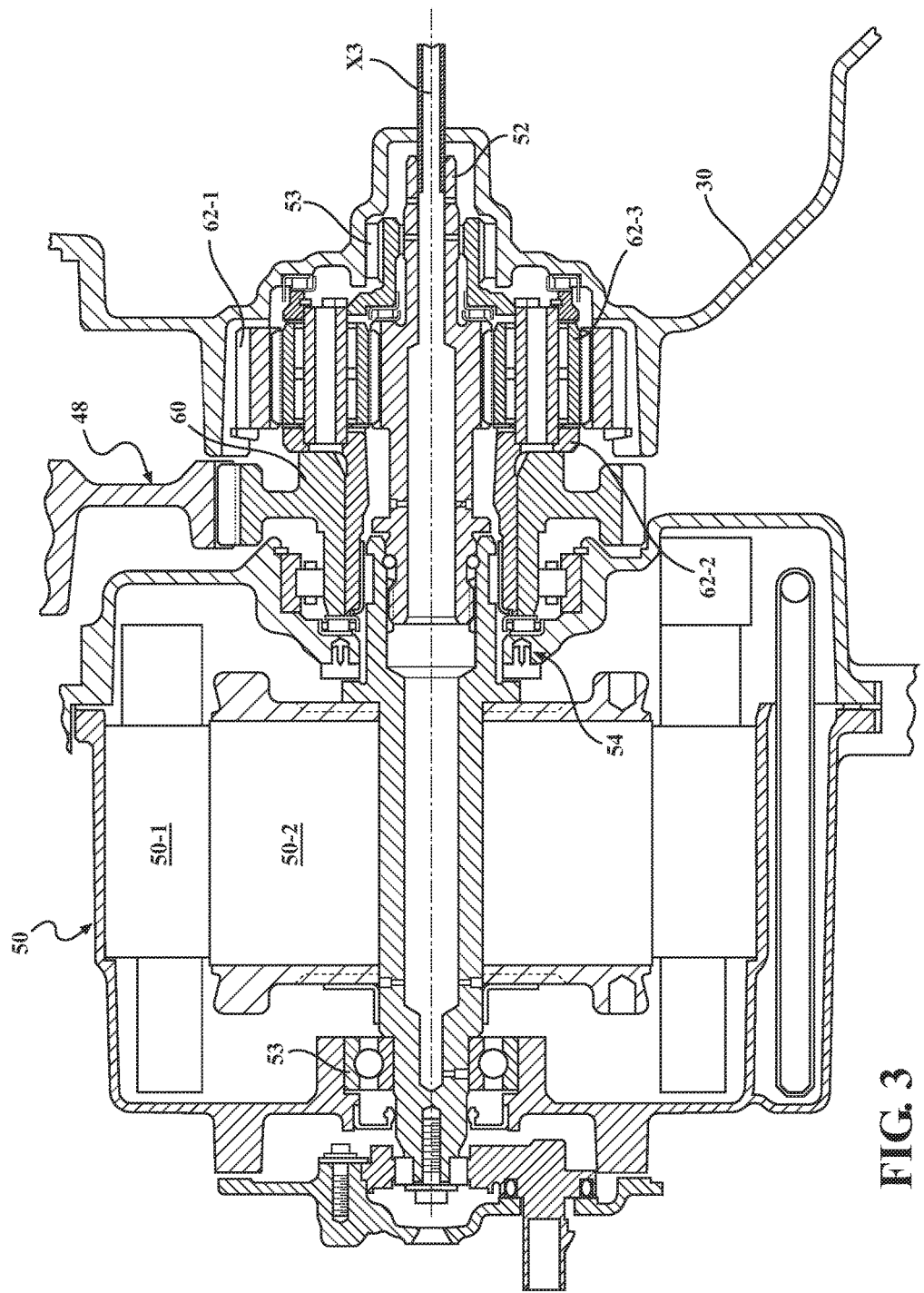
FIG. 3 is a schematic close-up illustration of the electric motor shown in FIGS. 1 and 2.
Figure 4:
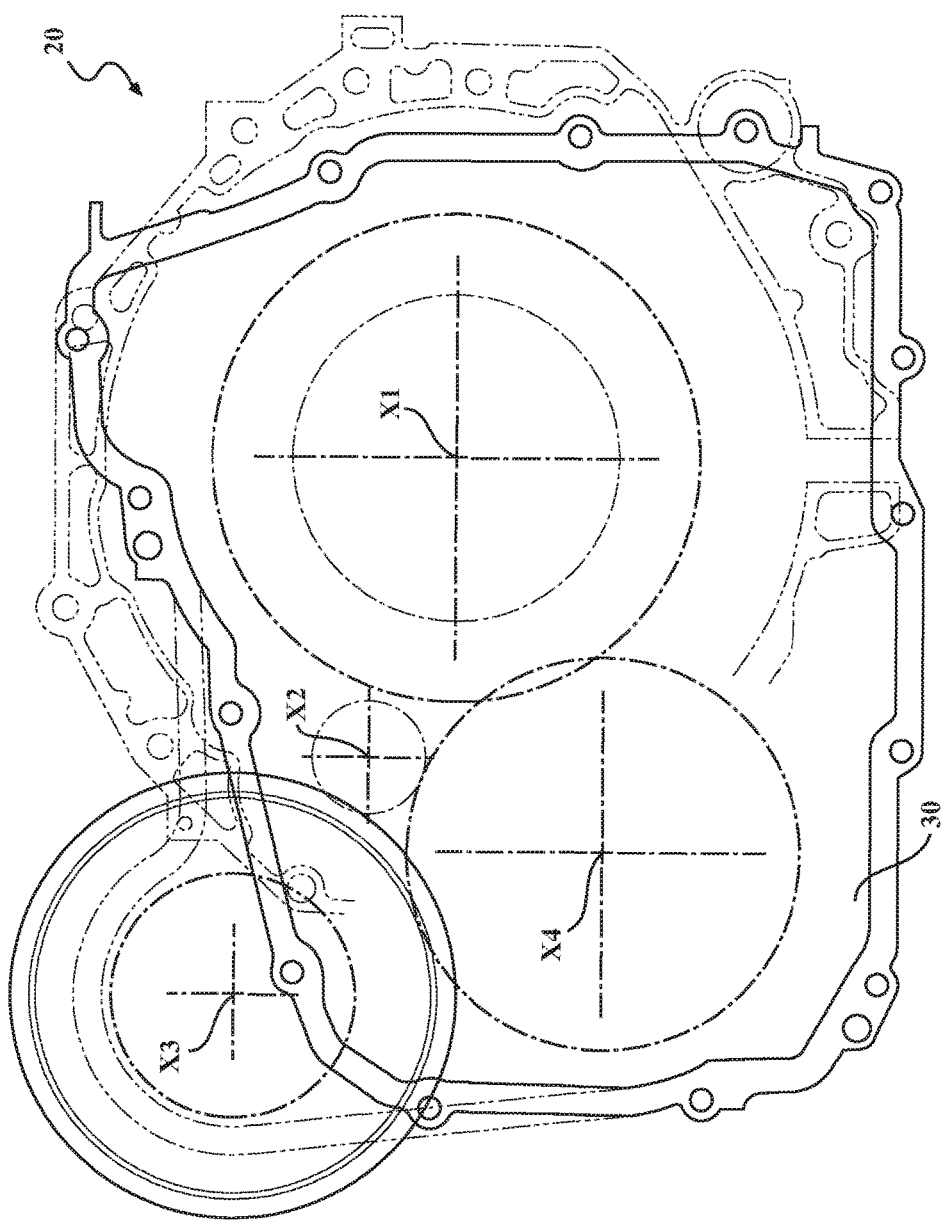
FIG. 4 is a schematic front view of the automatic transaxle shown in FIGS. 1 and 2, depicting a relative arrangement of transaxle parallel shafts and meshed transaxle elements positioned thereon.

With continued reference to FIG. 2, the transaxle 20 additionally includes an electric motor 50 arranged on a third axis X3 that is arranged in parallel with the second axis X2. As shown, the electric motor 50 includes a stator 50-1 fixed to the transaxle housing 30 and a rotor 50-2 fixed to a rotor shaft 52. The electric motor 50 is configured to provide an electric motor torque input $T_e$ to the second transfer gear 48. Similar to the gear-train 30, the input member 36, the torque transmitting device(s) 40, the first transfer gear 44, the intermediate shaft 46, the second transfer gear 48, as well as specific elements of the differential assembly 42, the rotor shaft 52 may be supported with respect to the transaxle housing 30 via a bearings 53, such as roller bearings, pin bearings, thrust bearings, etc. As shown in FIGS. 2 and 3, an interlocking device 54 may be employed to selectively connect the electric motor 50 to the second transfer gear 48 and thereby provide a variable electric motor torque input $T_e$ to the second transfer gear. Such an interlocking device 54 may, for example, be configured either as a synchronizer or a dog-clutch.

The differential assembly 42 is operatively connected to the intermediate shaft 46 and configured to rotate about a fourth axis X4 that is arranged in parallel with the second axis X2 to thereby transmit the transaxle output torque $T_o$ for driving the external load. Accordingly, the four transaxle rotational axes X1-X4 are arranged in parallel relative to one another. To affect the above connection between the differential assembly 42 and the intermediate shaft 46, the intermediate shaft 46 may include a second outer spline 46B, while the differential assembly 42 may include a differential housing 56 and a differential ring gear 58 fixed to the differential housing. Although not immediately apparent in FIG. 2 because of the planar depiction of the transaxle 20, in such a construction, the second outer spline 46B may be in mesh with the differential ring gear 58 to transmit torque from the gear-train 32 to the differential housing 56. Overall, as shown in FIG. 2, in addition to the gear-train 32, the transaxle housing 30 is configured to retain each of the gear-train 32, the input member 36, the torque transmitting device(s) 40, the first transfer gear 44, the intermediate shaft 46, the second transfer gear 48, the electric motor 50, and the differential assembly 42.

As shown in FIG. 2, a third transfer gear 60 is arranged on the third axis X3. The third transfer gear 60 is operatively connected to the electric motor 50 and is in mesh with the second transfer gear 48. A reduction gear-set 62 arranged on the third axis X3 may operatively connect the third transfer gear 60 to the rotor shaft 52 and be configured to generate a speed ratio therebetween. The reduction gear-set 62 may be configured as an epicyclic gear-set having a ring gear 62-1 fixed to the transaxle housing 30. The epicyclic reduction gear-set 62 may also include a carrier member 62-2 fixed to the third transfer gear 60 and supporting a plurality of pinion gears 62-3 in mesh with the rotor shaft 52. In such an arrangement, the rotor shaft 52 performs the role of a sun gear in the epicyclic reduction gear-set 62. Accordingly, the electric motor 50 may apply the electric motor torque $T_e$ via the reduction gear-set 62 to the differential housing 56 through the differential ring gear 58. The electric motor torque $T_e$ may be applied to the differential housing 56 to assist the engine torque $T_i$ or to provide solely electric propulsion of the vehicle 10.

The transaxle 20 may be controlled by a programmable controller 64 to achieve a desired propulsion of the vehicle 10 in response to command(s) from an operator of the subject vehicle. Specifically, the controller 64 may be programmed to regulate operation of the torque transmitting devices 40 to select transaxle 20 speed ratios, activate the electric motor 50, and engage the interlocking device 54 to generate a predetermined amount of transaxle output torque $T_o$. The controller 64 may include a central processing unit (CPU) that regulates various functions on the vehicle 10, or be configured as a powertrain control module (PCM) configured to control the entire powertrain 12, or a dedicated transaxle control unit (TCU) for controlling solely the transaxle 20. Configured as either a CPU or a PCM for the powertrain 12, the controller 64 may be employed to control and coordinate operation of the power-source 14 and the transaxle 20. In either of the above configurations, the controller 64 includes a processor and tangible, non-transitory memory, which includes instructions for operation of the transaxle 20 programmed therein. The memory may be an appropriate recordable medium that participates in providing computer-readable data or process instructions. Such a recordable medium may take many forms, including but not limited to non-volatile media and volatile media.

Non-volatile media for the controller 64 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 64 may also include a floppy disk, a flexible disk, hard disk, magnetic tape, another magnetic medium, a CD-ROM, DVD, another optical medium, etc. The controller 64 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 64 or accessible thereby may be stored in the memory and automatically executed to provide the required functionality of the transaxle 20.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An automatically-shiftable transaxle for mounting to an external power-source and transmitting a power-source torque therefrom, the transaxle comprising:
   an input member configured to receive the power-source torque and rotate about a first axis;
   a gear-train and at least one torque transmitting device, each operatively connected to the input member and cooperatively configured to select transaxle speed ratios;
   a first transfer gear operatively connected to the gear-train and configured to rotate about the first axis;
   an intermediate shaft configured to rotate about a second axis that is parallel to the first axis;
   a second transfer gear rotatably fixed to the intermediate shaft and in mesh with the first transfer gear;
   an electric motor arranged on a third axis that is parallel to the second axis and configured to provide an electric motor torque input to the second transfer gear; and
   a differential assembly operatively connected to the intermediate shaft and configured to rotate about a fourth axis that is parallel to the second axis to thereby transmit a transaxle output torque to drive a load; and
   a transaxle housing configured to support and retain each of the input member, the gear-train, the at least one torque transmitting device, the first transfer gear, the intermediate shaft, the second transfer gear, the electric motor, and the differential assembly;
   wherein:
      the electric motor includes a stator fixed to the transaxle housing and a rotor fixed to a rotor shaft, the transaxle further comprising: a third transfer gear in mesh with the second transfer gear and a reduction gear-set configured as an epicyclic gear-set;
      the epicyclic gear-set includes a ring gear fixed to the transaxle housing and a carrier member directly connected to the third transfer gear and supporting a plurality of pinion gears in mesh with the rotor shaft; and the epicyclic gear-set is configured to generate a speed ratio between the plurality of pinion gears and the rotor shaft.

2. The automatically-shiftable transaxle according to claim 1, wherein the gear-train includes a planetary gear-set having first, second, and third members, and wherein the first transfer gear is in mesh with the third member of the gear-set.

3. The automatically-shiftable transaxle according to claim 2, wherein the first member is a ring gear, the second member is a planetary carrier, and the third member is a sun gear.

4. The automatically-shiftable transaxle according to claim 1, further comprising an interlocking device configured to selectively connect the electric motor to the second transfer gear and thereby provide a variable electric motor torque input to the second transfer gear as the electric motor torque input.

5. The automatically-shiftable transaxle according to claim 4, wherein the interlocking device is configured as one of a synchronizer and a dog-clutch.

6. The automatically-shiftable transaxle according to claim 1, wherein the intermediate shaft includes a first outer spline in mesh with the second transfer gear.

7. The automatically-shiftable transaxle according to claim 6, wherein:

the intermediate shaft includes a second outer spline;

the differential assembly includes a differential housing and a differential ring gear fixed to the differential housing; and the second outer spline is in mesh with the differential ring gear.

8. The automatically-shiftable transaxle according to claim 1, wherein the rotor shaft is supported with respect to the transaxle housing via a plurality of bearings.

9. A vehicle comprising:

a power-source configured to generate a power-source torque;

an automatically-shiftable transaxle mounted externally to the power-source and configured to transmit the power-source torque; and a road wheel configured to receive the power-source torque transmitted by the transaxle;

wherein the transaxle includes:

an input member configured to receive the power-source torque and rotate about a first axis;

a gear-train and at least one torque transmitting device, each operatively connected to the input member and cooperatively configured to select transaxle speed ratios;

a first transfer gear operatively connected to the gear-train and configured to rotate about the first axis;

an intermediate shaft configured to rotate about a second axis that is parallel to the first axis;

a second transfer gear rotatably fixed to the intermediate shaft and in mesh with the first transfer gear;

an electric motor arranged on a third axis that is parallel to the second axis and configured to provide an electric motor torque input to the second transfer gear; and a differential assembly operatively connected to the intermediate shaft and configured to rotate about a fourth axis that is parallel to the second axis to thereby transmit a transaxle output torque to drive the road wheel; and a transaxle housing configured to support and retain each of the input member, the gear-train, the at least one torque transmitting device, the first transfer gear, the intermediate shaft, the second transfer gear, the electric motor, and the differential assembly;

wherein:

the electric motor includes a stator fixed to the transaxle housing and a rotor fixed to a rotor shaft, the transaxle further comprising: a third transfer gear in mesh with the second transfer gear and a reduction gear-set configured as an epicyclic gear-set;

the epicyclic gear-set includes a ring gear fixed to the transaxle housing and a carrier member directly connected to the third transfer gear and supporting a plurality of pinion gears in mesh with the rotor shaft; and the epicyclic gear-set is configured to generate a speed ratio between the plurality of pinion gears and the rotor shaft.

10. The vehicle according to claim 9, wherein the gear-train includes a planetary gear-set having first, second, and third members, and wherein the first transfer gear is in mesh with the third member of the gear-set.

11. The vehicle according to claim 10, wherein the first member is a ring gear, the second member is a planetary carrier, and the third member is a sun gear.

12. The vehicle according to claim 9, wherein the automatically-shiftable transaxle additionally includes an interlocking device configured to selectively connect the electric motor to the second transfer gear and thereby provide a variable electric motor torque input to the second transfer gear as the electric motor torque input.

13. The vehicle according to claim 12, wherein the interlocking device is configured as one of a synchronizer and a dog-clutch.

14. The vehicle according to claim 9, wherein the intermediate shaft includes a first outer spline in mesh with the second transfer gear.

15. The vehicle according to claim 14, wherein:

the intermediate shaft includes a second outer spline;

the differential assembly includes a differential housing and a differential ring gear fixed to the differential housing; and the second outer spline is in mesh with the differential ring gear.

16. The vehicle according to claim 9, wherein the rotor shaft is supported with respect to the transaxle housing via a plurality of bearings.

* * * * *